(12) United States Patent
Lertrattanapanich et al.

(10) Patent No.: US 8,081,256 B2
(45) Date of Patent: Dec. 20, 2011

(54) METHOD AND SYSTEM FOR EDGE DIRECTED DEINTERLACING IN VIDEO IMAGE PROCESSING

(75) Inventors: Surapong Lertrattanapanich, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1307 days.

(21) Appl. No.: 11/725,866

(22) Filed: Mar. 20, 2007

(65) Prior Publication Data

US 2008/0231746 A1 Sep. 25, 2008

(51) Int. Cl.
*H04N 11/20* (2006.01)
*H04N 5/21* (2006.01)

(52) U.S. Cl. ........................................ 348/448; 348/625

(58) Field of Classification Search .................. 348/625, 348/448, 458, 452, 581; 382/266, 298–300; 345/660
See application file for complete search history.

(56) References Cited

U.S. PATENT DOCUMENTS

| | | | |
|---|---|---|---|
| 5,625,421 A | 4/1997 | Faroudja et al. | |
| 5,661,525 A | 8/1997 | Kovacevic et al. | |
| 5,786,862 A | 7/1998 | Kim et al. | |
| 5,929,918 A * | 7/1999 | Marques Pereira et al. | 348/448 |
| 6,133,957 A * | 10/2000 | Campbell | 348/458 |
| 6,577,345 B1 | 6/2003 | Lim et al. | |
| 6,614,484 B1 | 9/2003 | Lim et al. | |
| 7,099,509 B2 | 8/2006 | Wang et al. | |
| 7,403,234 B2 | 7/2008 | Lertrattanapanich et al. | |
| 2002/0015508 A1 * | 2/2002 | Hannigan et al. | 382/100 |
| 2002/0030762 A1 * | 3/2002 | Kishimoto | 348/625 |
| 2004/0207753 A1 * | 10/2004 | Jung | 348/452 |
| 2005/0073607 A1 * | 4/2005 | Ji et al. | 348/448 |
| 2005/0276506 A1 * | 12/2005 | Kwon et al. | 382/269 |
| 2006/0039590 A1 * | 2/2006 | Lachine et al. | 382/128 |
| 2010/0157147 A1 * | 6/2010 | Bellers | 348/448 |

OTHER PUBLICATIONS

Seth-Smith, N. and Walker, "Flexible upconversion for high quality TV and multimedia displays," in Proc. ICCE, Chicago, IL, Jun. 1996, pp. 338-339.
G. De Haan and E. B. Bellers, "Deinterlacing—An Overview," Proceedings of the IEEE, vol. 86, No. 9, Sep. 1998, pp. 1839-1857.
Bishop, C., Neural Networks for Pattern Recognition, Clarendon, Oxford, UK, 1996.
Lay, D., Linear Algebra and Its Applications, Addison-Wesley, NY, 2000, $2^{nd}$ Edition.
D. I. C. Hentschel, "Comparison Between Median Filtering and Vertical Edge Controlled Interpolation for Flicker Reduction," IEEE Transactions on Consumer Electronics, vol. 35, No. 3, Aug. 1989, pp. 278-289.
M. K. Park, et al., "New Edge Dependent Deinterlacing Algorithm Based on Horizontal Edge Pattern," IEEE Transactions on Consumer Electronics, vol. 49, No. 4, Nov. 2003, pp. 1508-1512.

* cited by examiner

*Primary Examiner* — Victor Kostak (57) ABSTRACT

A method and a system is provided for deinterlacing interlaced video containing an interlaced image field f including scan lines of multiple pixels. Such deinterlacing involves detecting the one or more edge directions in the image field f using principal component analysis (PCA), and performing spatial interpolation to reconstruct a missing pixel value in the image field f substantially along each of the one or more detected edge directions.

20 Claims, 6 Drawing Sheets

METHOD AND SYSTEM FOR EDGE DIRECTED DEINTERLACING IN VIDEO IMAGE PROCESSING

FIELD OF THE INVENTION

The present invention relates to image processing, and more particularly to edge directed deinterlacing in video image processing.

BACKGROUND OF THE INVENTION

In television systems, a specific scan format called "interlaced scan format" is widely utilized. Due to the advent of digital television (DTV) signals, deinterlacing is utilized for converting from the interlaced scan format into a progressive scan format for DTV applications. There are two main deinterlacing techniques: an inter-field (or motion-compensated) interpolation technique and an intra-field (or spatial) interpolation technique. The inter-field technique requires more than one field as an input while the intra-field technique requires only one field to process.

Figure 1:
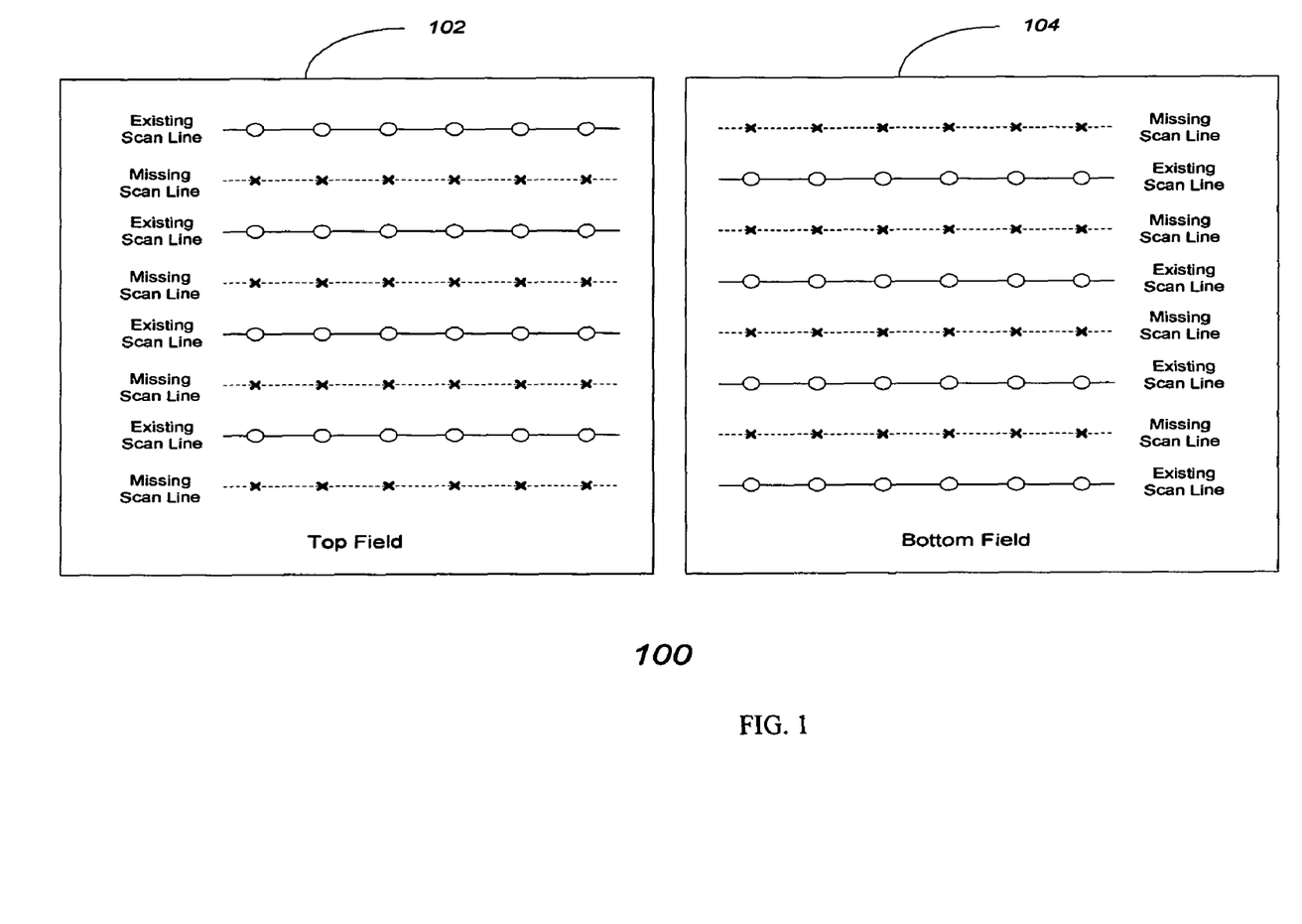
FIG. 1 illustrates an example of top and bottom fields in an interlaced scan format.

FIG. 1 illustrates an example interlaced scan format 100 including a "top" field 102 and a "bottom" field 104, which are scanned in an alternate manner on the TV screen to form the whole picture. Each "field" is formed by a stack of the "existing scan lines" as shown in FIG. 1. Each field (either top or bottom) contains only half the numbers of scan lines of the whole picture, while the other half of scan lines, denoted by "missing scan line" in FIG. 1, are missing from that field.

In FIG. 1, the symbols ○ denote the pixels on the existing scan lines in both the top and bottom fields 102 and 104. Further, the symbols x denote the pixels on the missing scan lines, in both the top and bottom fields 102 and 104. The main object of the intra-field deinterlacing technique is to interpolate each missing pixel x in both the top and bottom fields from its neighboring existing pixels ○.

An existing implementation for intra-field deinterlacing includes simple line doubling and vertical line averaging. However, the video qualities of these two implementations produce various artifacts, such as edge jaggedness or edge blurring, making them unsuitable for DTV applications.

A more advanced intra-field deinterlacing technique utilizes edge directed interpolation (EDI). Conceptually, the EDI intra-field deinterlacing technique takes advantage of the direction of edges in an image represented by the two fields, to interpolate the missing pixels. More specifically, the direction of edges associated with each missing pixel is calculated and the set of existing pixels along that calculated edge direction is used to interpolate a missing pixel. The edge detections in many implementations of the EDI intra-field deinterlacing technique are usually determined based on the maximum correlation of a pair of vectors formed by the set of existing pixels immediately above and below the missing pixel.

However, there are many drawbacks to the conventional EDI intra-field deinterlacing technique. First, noise can complicate proper detection of edge direction. Though setting a wider vector can help reduce this effect, it also increases the probability of misdetection in certain areas. Second, in certain areas, such as thin lines and complex detail areas, the vector correlation tends to result in incorrect direction detection. Third, the number of possible directions are limited to a preset number, and directions such as steep angles (close to vertical direction), are usually inaccessible. There is, therefore, a need for a deinterlacing technique that performs edge directed deinterlacing that addresses the above drawbacks.

BRIEF SUMMARY OF THE INVENTION

The present invention provides a method and a system for deinterlacing interlaced video comprising an interlaced image field f including scan lines of multiple pixels. In one embodiment, such deinterlacing involves detecting the one or more edge directions in the image field f using principal component analysis (PCA), and performing spatial interpolation to reconstruct a pixel value in the image field f substantially along a detected edge direction. The pixel value corresponds to a missing pixel in the interlaced field f. Performing interpolation further includes performing directional interpolation on existing pixels neighboring the missing pixel in the field f to obtain an interpolated signal $f_d$ as the reconstructed missing pixel.

In addition, existing pixels neighboring the missing pixel in the field f are filtered, to obtain a filtered signal $f_v$, and one of the signals $f_v$ and $f_d$ is selected as an output signal $f_p$ representing the reconstructed missing pixel. The selection is based on the mean value of existing pixels neighboring the missing pixel.

Detecting one or more edge directions includes determining a set of horizontal gradients and vertical gradients associated with existing pixels neighboring the missing pixel and then determining a covariance matrix from the horizontal gradients and the vertical gradients, wherein the principal component of the covariance matrix is based on PCA. Then, based on the covariance matrix, an eigenvector is determined which represents a detected edge direction.

In addition, eigenvalues are determined based on the covariance matrix, and are used to calculate a reliability factor that indicates the level of reliability of said eigenvector as the direction of a detected edge. Then, the interpolated signal $f_d$ is determined by mixing the directional interpolated value and the filtered signal $f_v$ as a function of the reliability factor.

These and other features, aspects and advantages of the present invention will become understood with reference to the following description, appended claims and accompanying figures.

BRIEF DESCRIPTION OF THE DRAWINGS

In the drawings, like references refer to similar elements.

DETAILED DESCRIPTION OF THE INVENTION

The present invention provides an intra-field interpolation deinterlacing technique that utilizes an edge directed deinterlacing technique based on PCA. PCA provides for the representation of shape, orientation and appearance. Application of PCA to the edge direction detection in deinterlacing provides accurate edge direction detection even when the edges are in noisy image areas. The detected edge directions are denoted by eigenvectors which can represent infinite number of directions including those at very steep angles.

Figure 2:
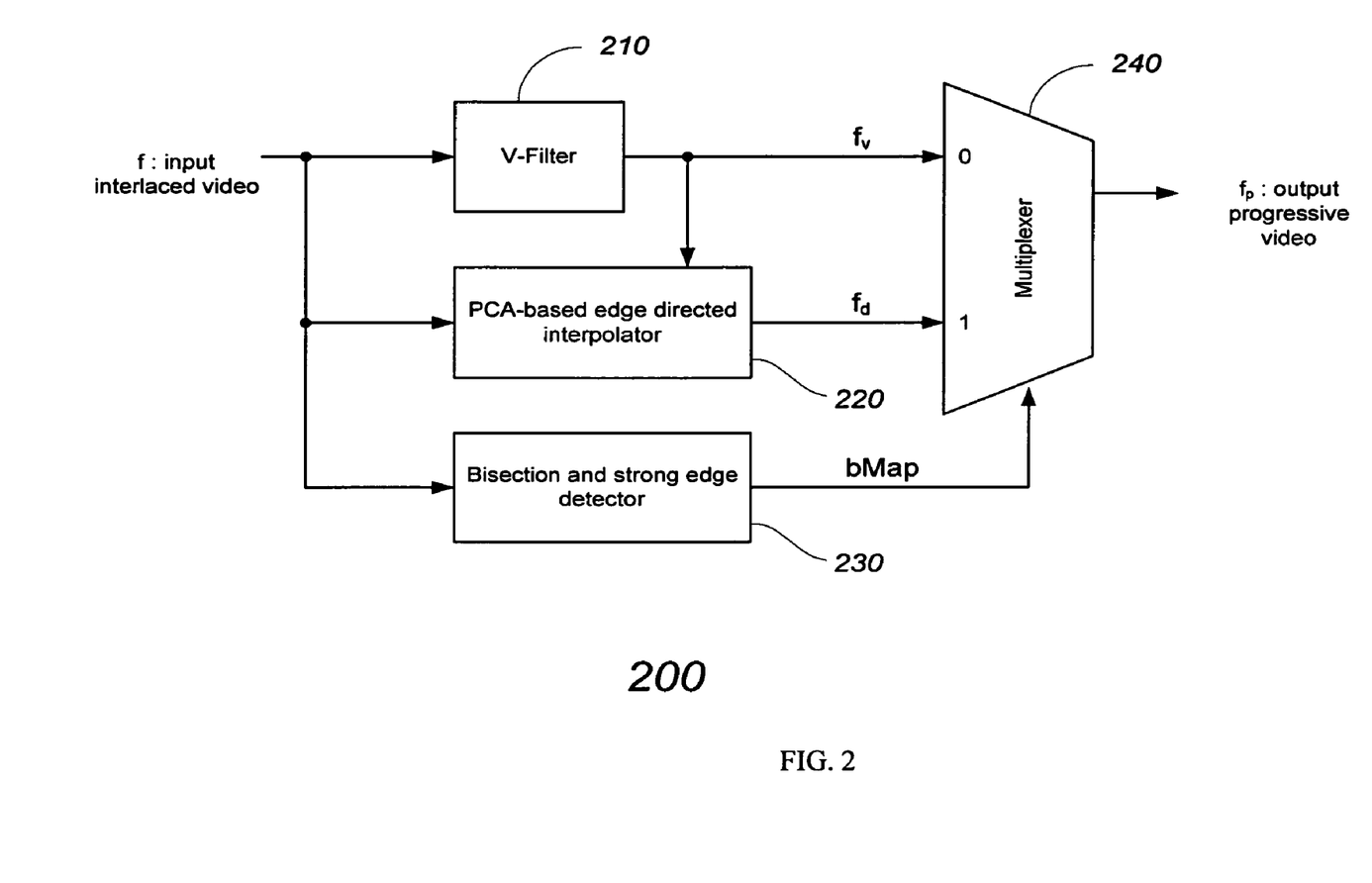
FIG. 2 shows a functional block diagram of an example system implementing a PCA-based edge directed deinterlacing method, according to an embodiment of the present invention.

FIG. 2 shows a functional block diagram of an example system 200 implementing a PCA-based edge directed deinterlacing technique, according to an embodiment of the present invention. An interlaced input field f is processed by: (1) a V-Filter 210 that performs vertical filtering on the field f to obtain a vertical filtered signal $f_v$, (2) a PCA-based edge directed interpolator 220 that performs directional interpolation on the field f to obtain a signal $f_d$, and (3) a bisection and strong edge detector 230 that performs bisection and strong edge detection on the field f to generate a binary map bMap.

The V-Filter 210 interpolates the missing pixels along the vertical direction only. It is applied to the missing pixels belonging to image areas that do not include strong edges or bisection (e.g., textured) areas (i.e., bMap=0).

As is known to those skilled in the art, principal component analysis is a technique for simplifying a data set, by reducing multidimensional data sets to lower dimensions for analysis. The PCA-based EDI 220 performs interpolation on missing pixels along a detected edge direction. PCA-based EDI is applied only to the missing pixels belonging to image areas that include strong edges but no bisection (i.e., bMap=1). In effect, the missing pixels that belong to strong edges but not to bisection areas, are represented by $f_d$, while the other remaining missing pixels are represented by $f_v$.

Figure 3:
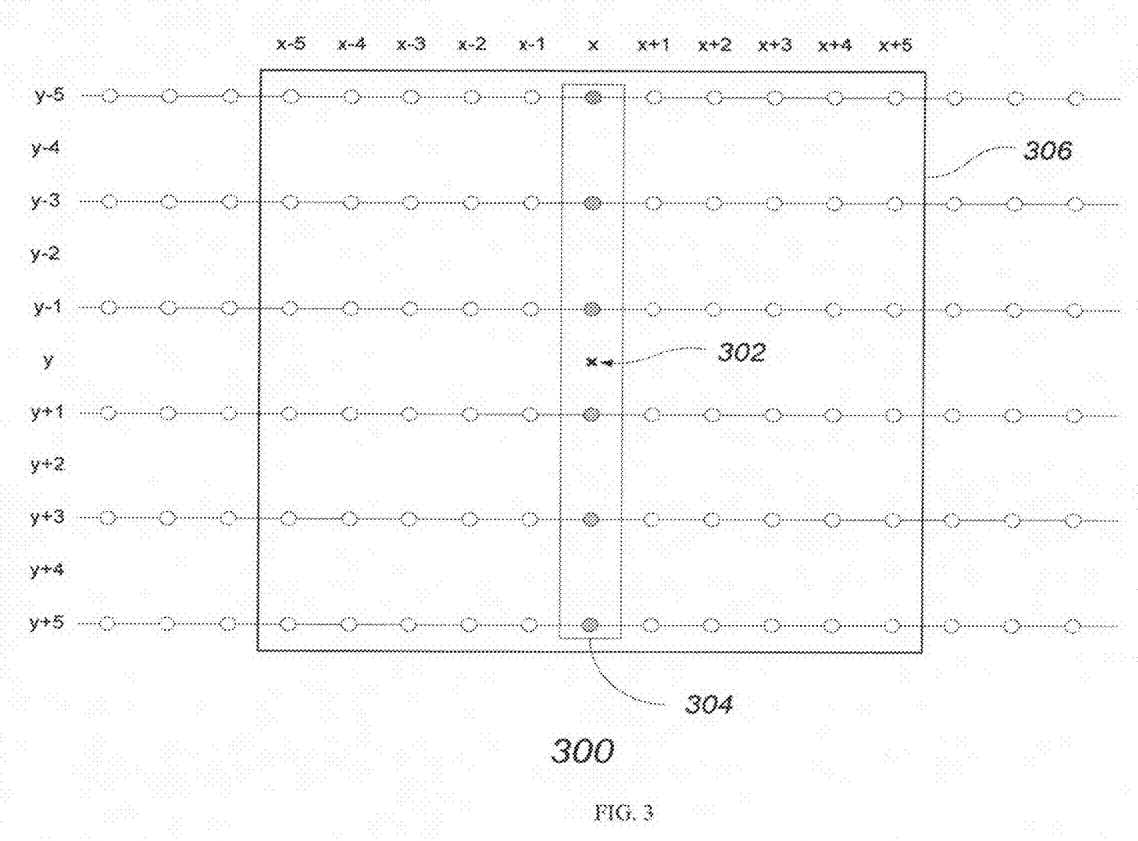
FIG. 3 shows an example set of existing pixels grouped by a rectangular window for vertical filtering and grouped by a square window for PCA-based calculation, according to an embodiment of the present invention.

The binary map bMap is used by a multiplexer 240 to determine which of the resulting signals $f_v$ or $f_d$ is selected as an output signal $f_p$ of the system 200. FIG. 3 shows an example field 300 (e.g., either top field 102 or bottom field 104 in FIG. 1), which is of size M*N (e.g., height by width) pixels, wherein indices y and x denote the scan line number and pixel location, respectively, in the input field f 300. For each missing scan line y=1, 3, 5, . . . , M−1, and missing pixel locations x=0, 1, . . . , N−1, the multiplexer 240 generates an output according to relation (1) below:

$$f_p[y][x] = \begin{cases} f_v[y][x] & \text{if } bMAp[y][x] == 0 \\ f_d[y][x] & \text{if } bMap[y][x] == 1 \end{cases}. \quad (1)$$

In FIG. 3, a missing pixel 302 is represented by f[y][x] in the field f 300. The window 304 includes a group of neighboring existing pixels for the missing pixel 302. The window 306 contains another group of neighboring existing pixels for the missing pixel 302. Existing pixels in the rectangular window 304 are for filtering by the V-Filter 210, and the existing pixels in the square window 306 are for PCA-based calculation by the PCA-based EDI 220. An example size for the window 306 is 6-by-11 pixels and an example size for the window 304 is 6-by-1 pixels. Other sizes for the windows 304 and 306 are also possible.

An example of calculating $f_v$ or $f_d$ by the V-Filter 210 and the PCA-based EDI 220, respectively, are now described. A vertical filtered result $f_v[y][x]$ is calculated by applying the V-Filter 210 to the existing neighbors of the missing pixel 302 in the window 304. The resulting vertical filtered signal $f_v[y][x]$ can be represented by relation (2) below:

$$f_v[y][x]=(f[y-5][x]-12f[y-3][x]+75f[y-1][x]+75f[y+1][x]-12f[y+3][x]+f[y+5][x])/128. \quad (2)$$

In this example, the V-Filter 210 utilizes a set of filter coefficients that comprise: 1/128[1 −12 75 75 −12 1]. Conceptually, a value $f_v[y][x]$ for the missing pixel 302 is calculated by the V-Filter 210 from a weighted average (according to V-Filter coefficients) of the neighboring existing pixels along a vertical direction (i.e., window 304). The set of V-Filter coefficients used in relation (2) has 6 taps for low-pass filtering, but other examples are possible. Other sets of coefficients with shorter or longer numbers of taps can be used in the same manner. Another example of the V-Filter 210 may be a Vertical-Temporal (VT) filter such as described by N. Seth-Smith and G. Walker, "Flexible upconversion for high quality TV and multimedia displays," in Proc. ICCE, Chicago, Ill., June 1996, pp. 338-339, and G. de Haan and E. B. Bellers, "Deinterlacing—An Overview," Proceedings of the IEEE, Vol. 86, No. 9, September 1998, pp. 1839-1857.

Figure 4:
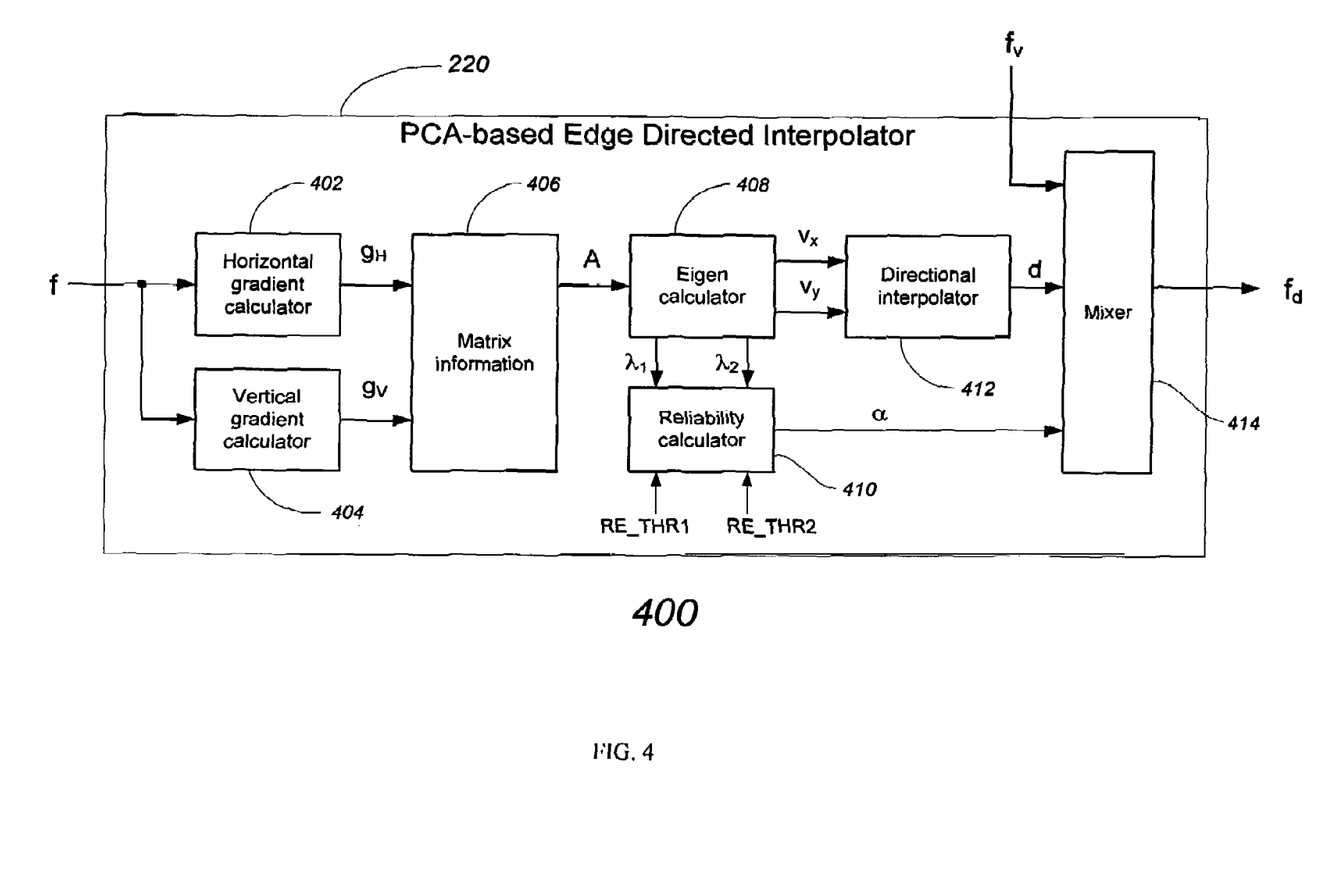
FIG. 4 shows a functional block diagram of an example of a PCA based edge directed interpolator, according to an embodiment of the present invention.

FIG. 4 shows a functional block diagram of an embodiment of the PCA-based EDI 220 for calculating $f_d$, according to a preferred embodiment of the present invention. First, based on the window 306 associated with the missing pixel f[y][x], a set of horizontal gradients $g_H$ and vertical gradients $g_v$ associated with each existing pixel within the window 306 are calculated using a horizontal gradient calculator 402 and a vertical gradient calculator 404, respectively.

The horizontal gradient calculator 402 implements relation (3) below for each existing pixel:

$$g_H[i][j]=f[i][j]-f[i][j-1],$$

wherein $i \in I=\{y-5,y-3,y-1,y+1,y+3,y+5\}$, and $$j \in J=\{x-5,x-4,x-3, \ldots ,x+5\}. \quad (3)$$

Relation (3) calculates the set of horizontal gradients at each existing pixel location (i, j) relative to the missing pixel f[y][x] (i and j denote vertical and horizontal indices, respectively). The gradients represent differences between pixel values along the horizontal direction. Therefore, at a location (i, j), the horizontal gradient is calculated by subtracting the immediate left neighboring existing pixel f[i] [j−1] from the existing pixel f[i] [j].

The vertical gradient calculator 404 determines the vertical gradients by implementing relation (4) below for each existing pixel:

$$g_v[i][j]=f[i][j]-f[i-1][j]. \quad (4)$$

For the vertical gradients, at each location (i, j), the vertical gradient is calculated by subtracting the immediate above neighboring existing pixel f[i−1] [j] from the existing pixel f[i] [j].

Next, a matrix A, which is the covariance matrix of the horizontal and vertical gradients, is determined. The matrix $A \in R^{2 \times 2}$ is formed by a matrix formation unit 406 according to relation (5) below:

$$A = \begin{bmatrix} A_{11} & A_{12} \\ A_{21} & A_{22} \end{bmatrix} = \quad (5)$$

$$\begin{bmatrix} \sum_{i \in I}\sum_{j \in J}(g_H[i][j])^2 & \sum_{i \in I}\sum_{j \in J}g_H[i][j]g_V[i][j] \\ \sum_{i \in I}\sum_{j \in J}g_H[i][j]g_V[i][j] & \sum_{i \in I}\sum_{j \in J}(g_V[i][j])^2 \end{bmatrix}.$$

After the resulting matrix A is formed, its eigenvalues $\lambda_1$ and $\lambda_2$ and an eigenvector $v_1=[v_x \; v_y]^T$ associated with the smaller eigenvalue $\lambda_1$ (assuming $\lambda_1 \leq \lambda_2$), are calculated by an eigen calculator 408, according to relations (6) and (7) below:

$$\lambda_1 = \frac{1}{2}(A_{11} + A_{22} + r), \quad (6)$$

$$\lambda_1 = \frac{1}{2}(A_{11} + A_{22} - r),$$

and $$v_1 = \begin{bmatrix} v_x \\ v_y \end{bmatrix} = \begin{bmatrix} 2A_{12} \\ A_{22} - A_{11} - r \end{bmatrix}, \quad (7)$$

where $$r = \sqrt{(A_{11} - A_{22})^2 - 4A_{12}A_{21}}.$$

Relations (6) and (7) are standard closed form relations for calculating eigenvalue and eigenvectors when the input covariance matrix is of size 2×2 as in relation (5). As such, the gradient calculators 402, 404, the matrix formation unit 406 and the eigen calculator 408, together implement an edge detector that performs edge detection including edge direction detection which in this example provides the eigenvector $v_1$ that is proportional to the direction of a detected edge.

Once both eigenvalues $\lambda_1$ and $\lambda_2$ are obtained, a reliability factor α is calculated by a reliability calculator 410 according to relation (8) below:

$$\alpha = \min\left(1.0, \max\left(0.0, \frac{\lambda_2/\lambda_1 - RE\_THR1}{RE\_THR2 - RE\_THR1}\right)\right), \quad (8)$$

wherein the thresholds RE_THR1 and RE_THR2 are used for limiting the reliability factor α within the range from 0.0 to 1.0. The ratio $\lambda_2/\lambda_1$ in relation (8) indicates how reliable eigenvector $v_1$ is as the direction of a detected edge. The reliability factor α ranges from 0.0 (not reliable) to 1.0 (very reliable). If the ratio $\lambda_2/\lambda_1$ is less than or equal to RE_THR1, the reliability factor α is set to 0.0 (not reliable). If the ratio $\lambda_2/\lambda_1$ is greater than or equal to RE_THR2, the reliability factor α is set to 1.0 (very reliable). When the ratio $\lambda_2/\lambda_1$ is in-between RE_THR1 and RE_THR2, the reliability factor α is proportional to the ratio $\lambda_2/\lambda_1$ and has a value from 0.0 to 1.0.

The typical values for RE_THR1 and RE_THR2 are set to e.g., 4.0 and 12.0, respectively. If the ratio $\lambda_2/\lambda_1$, is less than or equal 4.0, then the detected edge direction according to eigenvector $v_1$ is not reliable (α=0). On the other hand, if the ratio $\lambda_2/\lambda_1$ is greater than or equal to 12.0, the detected edge direction according to eigenvector $v_1$ is highly reliable (α=1). When the ratio $\lambda_2/\lambda_1$ is in between 4.0 and 12.0, the reliability factor is proportional to the ratio and has a value from 0.0 to 1.0. The two threshold values were selected by the inventors as default values, based on extensive experimentation.

It is noted that when $\lambda_1 \leq \lambda_2$, the orientation of the eigenvector $v_1 = [v_x v_y]^T$ associated with the smaller eigenvalue $\lambda_1$ is proportional to the dominant edge direction in the window 306 whose center is the missing pixel f[y][x] (302 in FIG. 3).

The directional interpolator 412 determines an edge direction proportional to $v_1 = [v_x v_y]^T$ and generates a directional interpolated value d (i.e., d[y][x]) associated with the missing pixel f[y][x] along the edge direction. At the final stage, the vertical filtered signal $f_v$[y][x] from the V-Filter 210 (FIG. 2) and the directional interpolated signal d[y][x] are mixed together using a mixer 414 based on the reliability factor α to obtain a mixed directional interpolated signal $f_d$[y][x], according to relation (9) below:

$$f_d[y][x] = \alpha \cdot d[y][x] + (1-\alpha) f_v[y][x]. \quad (9)$$

As such, the signal $f_d$[y][x] is calculated by mixing between d[y][x] and $f_v$[y][x] with a contribution ratio of α and its complement, 1−α, respectively.

Figure 5:
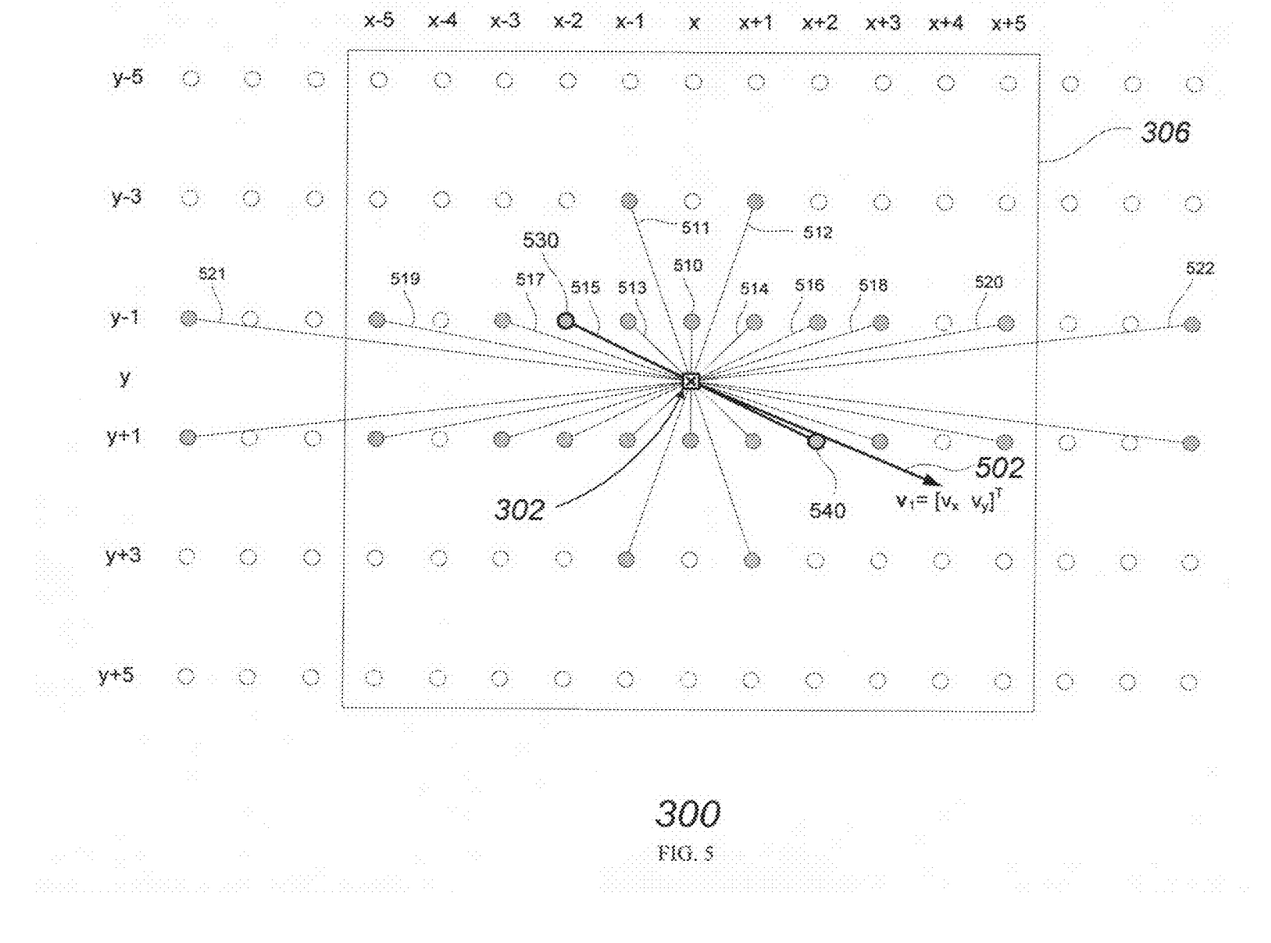
FIG. 5 shows an example of a set of edge directions associated with a missing pixel.

FIG. 5 shows another view of the field 300 including a set of 13 edge direction candidates {510, 511, ..., 522} associated with the missing pixel 302 in the window 306. A method of selecting the edge direction closest to the direction of eigenvector $v_1$, by the directional interpolator 412 is now described by example. Suppose an eigenvector 502 is the vector pointing to the same direction as the eigenvector $v_1$ whose starting point is at the missing pixel 302. Among the set of all edge directions {510, 511, ..., 522}, the edge direction 515 is the closest direction to the direction of eigenvector 502. Therefore, the edge directed interpolated value d[y][x] in accordance with the edge direction 515, is calculated by averaging between the existing pixels at both ends the edge direction 515 (i.e., pixels 530 and 540).

The set of 13 edge directions {510, 511, ..., 522} in FIG. 5 is by way of example, and those skilled in the art recognize that other sets with smaller or larger number of edge directions can also be used wherein the method of selecting the edge direction closest to the direction of eigenvector is adjusted accordingly.

Figure 6:
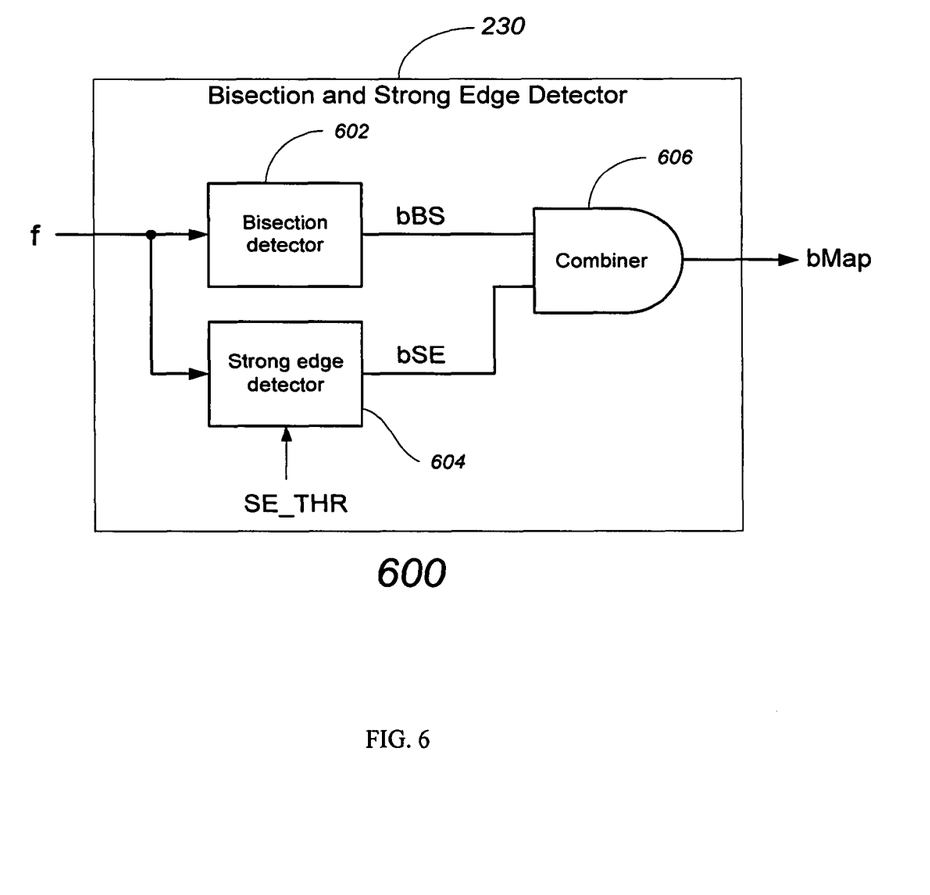
FIG. 6 shows a functional block diagram of an example of a bisection and strong edge detector, according to an embodiment of the present invention.

FIG. 6 shows a functional block diagram of an embodiment of the bisection and strong edge detector 230 of FIG. 2 that generates the binary map bMap. The detector 230 includes a bisection detector 602 and a strong edge detector 604. Bisection detection and strong edge detection functions are independent and can be performed in a parallel manner.

The bisection detector 602 generates a binary decision bBS (0 or 1) indicating whether or not the missing pixel f[y][x] (302 in FIG. 3) belongs to a bisection area. The bisection area is defined as the area whose pixel values can be clearly separated into two sections. An example of detecting a bisection pattern for use in conjunction with the deinterlacing is briefly described. For each missing pixel in a current input field, a window W is constructed, whose center pixel is at the considered missing pixel. A binary map is generated which includes rows of values corresponding to pixels in the window, wherein the values indicate if each element of the window is greater than the sample mean of the area surrounding the missing pixel. The number of value changes in the values in each row of the binary map is counted. It is then determined whether or not the missing pixel is within the bisection pattern based on said counts (there are two sets of value change counts corresponding to two rows). In order to maintain both the low angle edge direction detection capability and low misdetection probability, complicated areas are identified by the bisection pattern detection method. Then deinterlacing is performed. Bisection detection examples are described in the related U.S. patent application Ser. No. 11/121,815, entitled "A Method for Detecting Bisection Pattern In Deinterlacing," filed on May 2, 2005, incorporated herein by reference.

Suppose the sample mean of all existing pixels within the window 306 (FIG. 3) is denoted by μ. Then, a binary matrix B =[$b_{ij}$] of the same size as the window 306 is determined by comparing each pixel value to mean μ, according to relation (10) below:

$$b_{ij} = \begin{cases} 1 & \text{if } f[i][j] \geq \mu \\ 0 & \text{otherwise} \end{cases} \quad (10)$$

wherein $$i \in I = \{y-5, y-3, y-1, y+1, y+3, y+5\},$$

and $$j \in J = \{x-5, x-4, x-3, \ldots, x+5\}.$$

As such, for each existing pixel location (i,j) within the window 306, the associated binary value $b_{ij}$ is set to 1 if f[i][j] is greater than or equal to the mean value of at least a plurality of the existing pixel values within the window 306 neighboring the missing pixel 302, otherwise $b_{ij}$ is set to 0.

For each row i∈I in binary matrix B, the number of sign changes are counted along the horizontal direction according to relation (11) below:

$$nbSC_h[i] = \sum_{j \in J} |b_{i,j} - b_{i,j-1}|. \quad (11)$$

Similarly, for each column j∈J, the number of sign changes are counted along the vertical direction according to relation (12) below:

$$nbSC_v[j] = \sum_{i \in I} |b_{i,j} - b_{i-1,j}|. \quad (12)$$

Then, the binary decisions $BS_h$ and $BS_v$ in the horizontal and vertical directions are obtained in accordance to relations (13) and (14), respectively:

$$BS_h = \begin{cases} 1 & \text{if } nbSC_h[i] \leq 1, \text{ for all row } i \in I', \\ 0 & \text{otherwise} \end{cases} \quad (13)$$

$$BS_v = \begin{cases} 1 & \text{if } nbSC_v[j] \leq 1, \text{ for all column } j \in J', \\ 0 & \text{otherwise} \end{cases} \quad (14)$$

wherein the sets I' and J' can be equal to, or a subset of, respectively, I={y−5,y−3,y−1,y+1,y+3,y+5} and J={x−5,x−4,x−3,...,x+5}. In this description, I'={y−1,y+1} and J'={x−1,x+1}. If the number of sign changes in every row i in set I' is not greater than 1, then the missing pixel at location (x, y) belongs to a bisection area along the horizontal direction (i.e., $BS_h$=1). Otherwise, the missing pixel does not belong to the bisection area (i.e., $BS_h$=0). In a similar fashion, if the number of sign changes in every column j in set J' is not greater than 1, then the missing pixel at location (x, y) belongs to a bisection area along the vertical direction (i.e., $BS_v$=1). Otherwise, the missing pixel does not belong to the bisection area (i.e., $BS_v$=0).

In this example, the set I' contains row indices immediately above and below the missing pixel, and the set J' contains column indices immediately to the left and right of the missing pixel.

Once both the horizontal binary decision $BS_h$ and the vertical binary decision $BS_v$ are determined, the binary decision bBS in both directions is determined by the bisection detector 602 according to relation (15) below:

$$bBS = \text{AND}(BS_h, BS_v) \quad (15)$$

where the AND( ) is the logical AND operation.

Preferably, in parallel to operation of the bisection detector 602 described above, the strong edge detector 604 detects strong edges in the input field f. Suppose the mean and approximated local variance of the window 306 whose center pixel 302 is f[y][x], are denoted by μ and σ, respectively. The approximate local variance σ is determined according to relation (16) below:

$$\sigma = \frac{1}{66} \sum_{i \in I} \sum_{j \in J} |f[i][j] - \mu|. \quad (16)$$

Relation (16) provides calculation of an approximate local variance for the missing pixel 302, by averaging the absolute difference between the pixel values within the window 306 and the sample mean of the missing pixel 302. In this example, the window 306 is of size 6-by-11 pixels, such that the total number of pixels within the window 306 is 66.

The binary decision bSE from the strong edge detector 604 indicates whether or not the missing pixel 302 belongs to a strong edge area. The binary decision bSE is determined according to relation (17) below:

$$bSE = \begin{cases} 1 & \text{if } \sigma \geq \text{SE\_THR}, \\ 0 & \text{otherwise} \end{cases} \quad (17)$$

As such, the binary decision bSE is determined by using a hard threshold SE_THR. That is, if the local variance σ is greater than or equal to SE_THR, then the missing pixel 302 is considered to belong to the strong edge area (bSE=1), otherwise, it is not (bSE=0).

After both binary decisions from detectors 602 and 604 are determined, they are input to a combiner (e.g., logical AND gate) 606 to obtain the final resulting binary decision map bMap from the detector 230.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of deinterlacing interlaced video, comprising an interlaced image field f including scan lines of multiple pixels, comprising the steps of:
    detecting one or more edge directions in the image field f using principal component analysis (PCA);
    performing spatial interpolation to reconstruct a pixel value in the image field f substantially along each of the one or more detected edge directions and the pixel value corresponds to a missing pixel in the interlaced image field f;
    performing filtering on existing pixels neighboring the missing pixel in the field f, to obtain a filtered signal $f_v$;
    selecting between the signals $f_v$ and $f_d$ as an output signal $f_p$ representing the reconstructed missing pixel; and
    wherein the step of performing interpolation includes performing directional interpolation on existing pixels neighboring the missing pixel in the field f to obtain an interpolated signal $f_d$ as the reconstructed missing pixel.

2. The method of claim 1 wherein the step of selecting further includes selecting between the signals $f_v$ and $f_d$ as the output signal $f_p$ representing the reconstructed missing pixel, based on the mean value of existing pixels neighboring the missing pixel.

3. The method of claim 2 wherein the step of detecting one or more edge directions further includes the steps of:
   determining a set of horizontal gradients and vertical gradients associated with existing pixels neighboring the missing pixel;
   determining a covariance matrix from the horizontal gradients and the vertical gradients, wherein the principal component of the covariance matrix is based on PCA; and
   determining an eigenvector from the covariance matrix, wherein the eigenvector represents a detected edge direction.

4. The method of claim 3 wherein the step of performing interpolation further includes performing directional interpolation on existing pixels neighboring the missing pixel substantially along the detected edge direction to generate a directional interpolated value.

5. The method of claim 4 further comprising the steps of:
   determining eigenvalues $\lambda_1$ and $\lambda_2$ from the covariance matrix; and
   determining a reliability factor based on the eigenvalues, wherein the reliability factor indicates the level of reliability of said eigenvector as the direction of a detected edge.

6. The method of claim 5 further comprising the step of determining the interpolated signal $f_d$ as a function of the directional interpolated value and said reliability factor.

7. The method of claim 6 further comprising the step of determining the interpolated signal $f_d$ as a function of the directional interpolated value, the filtered signal $f_v$ and said reliability factor.

8. The method of claim 6 further comprising the step of determining the interpolated signal $f_d$ by mixing the directional interpolated value and the filtered signal $f_v$ as a function of the reliability factor.

9. The method of claim 6 further comprising the step of determining the interpolated signal $f_d$ by mixing the directional interpolated value and the filtered signal $f_v$ as a function of the reliability factor ($\alpha$), with a contribution ratio of $\alpha$ and $1-\alpha$, respectively.

10. The method of claim 1 wherein the step of performing filtering further includes low-pass filtering the existing pixels neighboring the missing pixel in the field f, to obtain a filtered signal $f_v$.

11. A system for deinterlacing interlaced video including an interlaced image field f containing scan lines of multiple pixels, the system comprising:
   an edge detector configured to detect one or more edge directions in the image field f using principal component analysis (PCA);
   an interpolator configured to perform spatial interpolation to reconstruct a pixel value in the image field f substantially along each of the one or more detected edge directions and the pixel value corresponds to a missing pixel in the interlaced field f,
   a filter configured to perform filtering on existing pixels neighboring the missing pixel in the field f, to obtain a filtered signal $f_v$,
   a selector configured to select between the signals $f_v$ and $f_d$ as an output signal $f_p$ representing the reconstructed missing pixel; and
   wherein the interpolator is further configured to perform directional interpolation on existing pixels neighboring the missing pixel in the field f to obtain an interpolated signal $f_d$ as the reconstructed missing pixel.

12. The system of claim 11 wherein the selector is configured to select between the signals $f_v$ and $f_d$ as the output signal $f_p$ representing the reconstructed missing pixel, based on the mean value of existing pixels neighboring the missing pixel.

13. The system of claim 12 wherein the edge detector comprises:
   a gradient calculation module configured to determine a set of horizontal gradients and vertical gradients associated with existing pixels neighboring the missing pixel;
   a covariance matrix calculator configured to determine a covariance matrix from the horizontal gradients and the vertical gradients, wherein the principal component of the covariance matrix is based on PCA; and
   an eigen calculator configured to determine an eigenvector from the covariance matrix, wherein the eigenvector represents a detected edge direction.

14. The system of claim 13 wherein the interpolator is further configured to perform directional interpolation on existing pixels neighboring the missing pixel substantially along the detected edge direction to generate a directional interpolated value.

15. The system of claim 14 wherein the eigen calculator is further configured to determines eigenvalues $\lambda_1$ and $\lambda_2$ from the covariance matrix, the system further comprising a reliability detector configured to determine a reliability factor based on the eigenvalues, wherein the reliability factor indicates the level of reliability of said eigenvector as the direction of a detected edge.

16. The system of claim 15 further comprising a mixer configured to determine the interpolated signal $f_d$ as a function of the directional interpolated value and said reliability factor.

17. The system of claim 16 therein the mixer is further configured to determine the interpolated signal $f_d$ as a function of the directional interpolated value, the filtered signal $f_v$ and said reliability factor.

18. The system of claim 16 wherein the mixer is further configured to determine the interpolated signal $f_d$ by mixing the directional interpolated value and the filtered signal $f_v$ as a function of the reliability factor.

19. The system of claim 16 wherein the mixer is further configured to determine the interpolated signal $f_d$ by mixing the directional interpolated value and the filtered signal $f_v$ as a function of the reliability factor ($\alpha$), with a contribution ratio of $\alpha$ and $1-\alpha$, respectively.

20. The system of claim 11 wherein the filter is configured to perform low-pass filtering on the existing pixels neighboring the missing pixel in the field f, to obtain a filtered signal $f_v$.

* * * * *